US005793956A

United States Patent [19]
Cox et al.

[11] Patent Number: 5,793,956
[45] Date of Patent: Aug. 11, 1998

[54] METHOD AND SYSTEM FOR TESTING AN AUDIOTEX SYSTEM

[75] Inventors: Leslie D. Cox, Arvada; Michael J. Bishara, Westminster, both of Colo.

[73] Assignee: U S West, Inc, Englewood, Colo.

[21] Appl. No.: 584,504

[22] Filed: Jan. 9, 1996

[51] Int. Cl.$^6$ ............................ G06F 11/00; H04M 1/64
[52] U.S. Cl. ...................... 395/200.36; 395/185.01; 395/185.02; 379/1; 379/2; 379/6; 379/67
[58] Field of Search ........................... 364/514 B; 379/1, 379/2, 14, 26, 27, 31, 32, 67; 327/20; 371/62, 48; 395/185.01, 185.02, 185.03

[56] References Cited

U.S. PATENT DOCUMENTS

| | | | |
|---|---|---|---|
| 4,602,134 | 7/1986 | Atkinson et al. | 379/27 |
| 4,887,298 | 12/1989 | Haigler | 381/55 |
| 5,073,919 | 12/1991 | Hagensick | 379/29 |
| 5,283,731 | 2/1994 | Lalonde et al. | 364/401 |
| 5,412,416 | 5/1995 | Nemirofsky | 348/10 |
| 5,448,625 | 9/1995 | Lederman | 379/67 |
| 5,557,539 | 9/1996 | Fitch | 364/514 B |
| 5,619,641 | 4/1997 | Ohuchi et al. | 395/181 |
| 5,631,847 | 5/1997 | Kikinis | 364/514 R |

*Primary Examiner*—Emanuel Todd Voeltz
*Assistant Examiner*—Demetra R. Smith
*Attorney, Agent, or Firm*—Brooks & Kushman P.C.

[57] ABSTRACT

An automatic method and system for testing an audiotex system. The method includes generating an input signal for receipt by the audiotex system, identifying a failure if the audiotex system fails to generate an output signal in response to the input signal, and transmitting a failure notification signal, the signal having a failure type associated therewith based on the input signal and the failure to generate an output signal. The method may also include identifying a failure if the audiotex system generates an output signal in response to the input signal indicating that the audiotex system is not fully operational, and transmitting a failure notification signal, the signal having a failure type associated therewith based on the input signal and the output signal generated in response thereto. The system includes input and output devices, a processor, memory and software for performing the method.

20 Claims, 17 Drawing Sheets

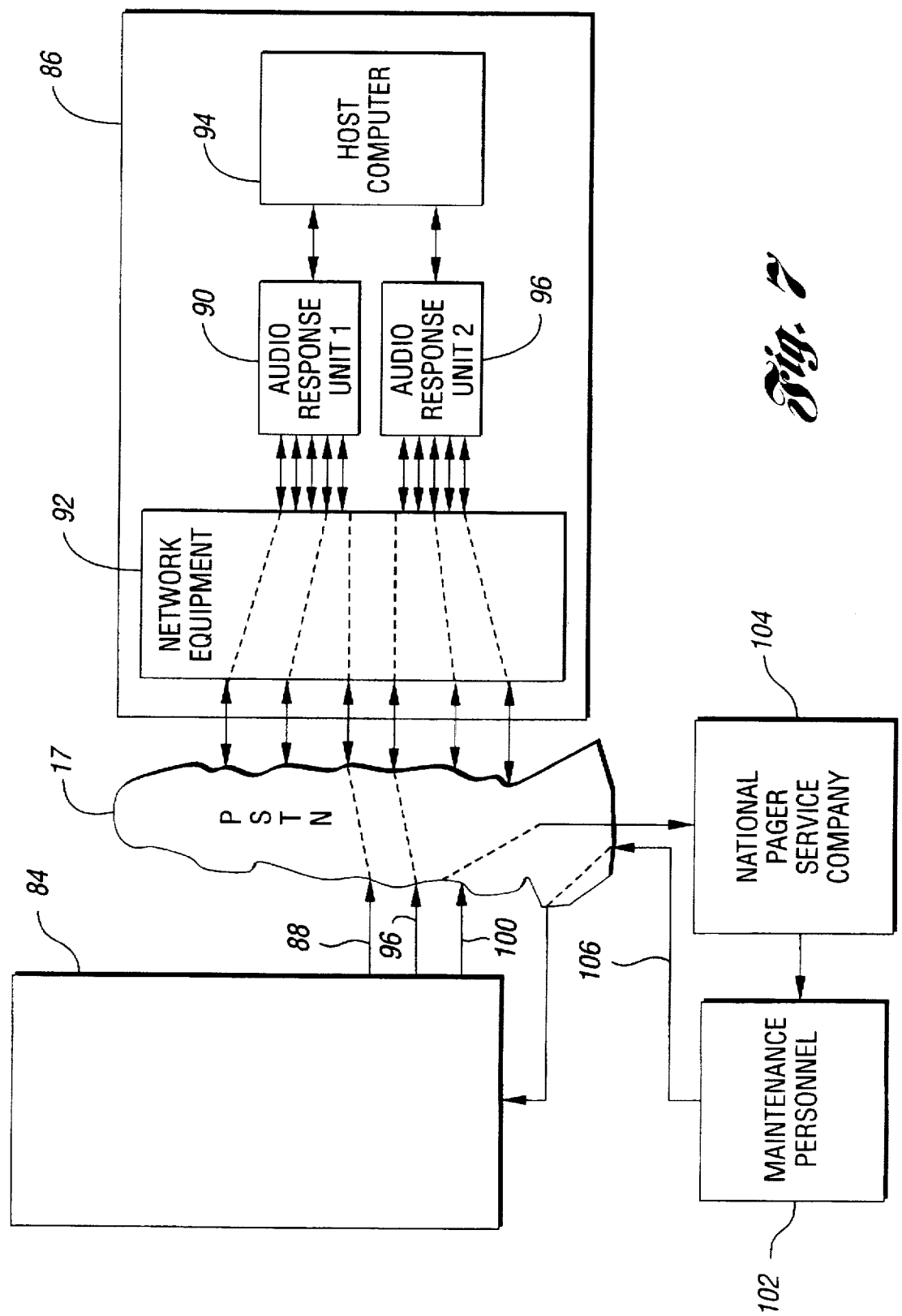

METHOD AND SYSTEM FOR TESTING AN AUDIOTEX SYSTEM

TECHNICAL FIELD

This invention relates to an automatic method and system, for testing an audiotex system.

BACKGROUND ART

Audiotex systems have been increasingly utilized by companies in a variety of fashions. Examples of such use include voice mail or electronic classified advertising systems, wherein sellers of goods and services augment print ads with audio ads.

Such audiotex systems can solve many needs that are currently unmet by conventional technology. With respect to an electronic classified advertising system, for example, a potential buyer can hear more detail about the product or service being offered than is included in a printed ad. Thus, the buyer is able to hear more detail without having to talk directly to the seller. The electronic ad can be updated frequently to show changes in price or availability of the goods and/or services. Existing electronic classified advertising systems have thus helped publishers to sell their advertising, sellers to sell their goods and services, and buyers to purchase same.

With the advent of audiotex systems such as electronic classified advertising systems, a need has also arisen for a method and system whereby the operation of an audiotex system may be checked and any problem concerning such operation may be reported for repair. Prior art methods and systems for such testing and reporting, however, typically require that the audiotex system to be checked be equipped with specific and unique dial-in ports/lines for such purposes. Moreover, such prior art methods and systems are unable to simultaneously verify that an audiotex system is accepting calls and is properly connected to the database associated therewith.

DISCLOSURE OF THE INVENTION

Accordingly, it is the principle object of the present invention to provide an improved method and system for testing an audiotex system.

According to the present invention, then, an automated method and system are provided for testing an audiotex system. The method comprises generating an input signal for receipt by the audiotex system, and identifying a failure if the audiotex system fails to generate an output signal in response to the input signal. The method also comprises transmitting a failure notification signal, the signal having a failure type associated therewith based on the input signal and the failure to generate an output signal. The method of the present invention may further comprise identifying a failure if the audiotex system generates an output signal in response to the input signal indicating that the audiotex system is not fully operational, and transmitting a failure notification signal, the signal having a failure type associated therewith based on the input signal and the output signal generated in response thereto.

The system of the present invention comprises means for generating an input signal for receipt by the audiotex system, and means for identifying a failure if the audiotex system fails to generate an output signal in response to the input signal. The system also comprises means for transmitting a failure notification signal, the signal having a failure type associated therewith based on the input signal and the failure to generate an output signal. The system of the present invention may further comprise means for identifying a failure if the audiotex system generates an output signal in response to the input signal indicating that the audiotex system is not fully operational, and means for transmitting a failure notification signal, the signal having a failure type associated therewith based on the input signal and the output signal generated in response thereto.

These and other objects, features and advantages will be readily apparent upon consideration of the following detailed description in conjunction with the accompanying drawings.

BRIEF DESCRIPTION OF DRAWINGS

FIGS. 3a–3e are a flow chart illustrating the auto locator interface;

FIGS. 6a–6d are a flow chart illustrating the direct ad access interface; and

FIG. 7 is a block diagram illustrating the remote testing/reporting feature.

BEST MODE FOR CARRYING OUT THE INVENTION

For explanation purposes only, the method and system for testing an audiotex system will be described herein with respect to the testing of an electronic classified advertising system. As will be readily apparent to those of ordinary skill in the art, however, the method and system of the present invention may be used in conjunction with the testing of any type of audiotex system.

Figure 1:
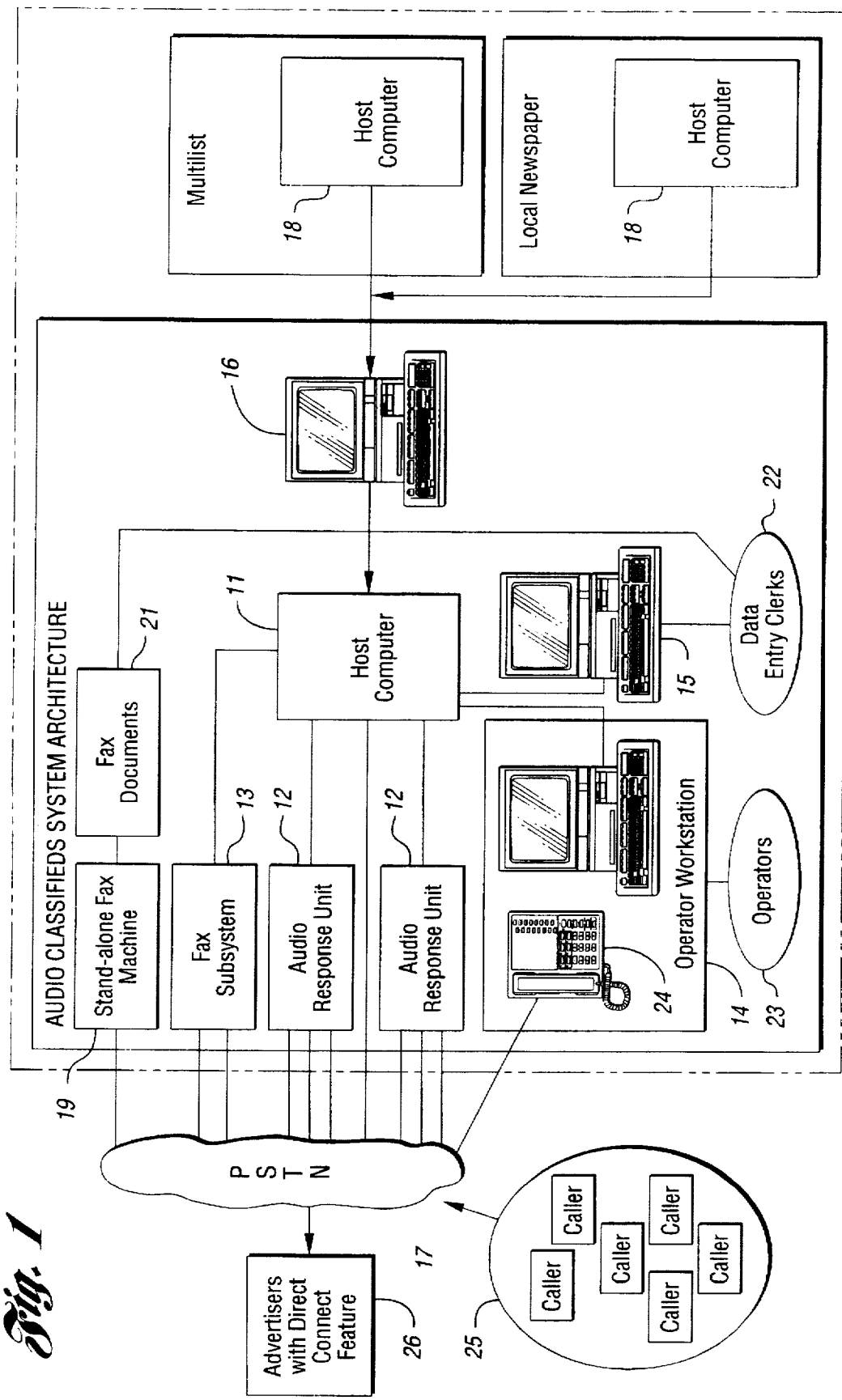
FIG. 1 is an architectural schematic of an electronic classified advertising type of audiotex system for use with the method and system of the present invention.

Referring now to FIG. 1, the architecture of an electronic classified advertising system is shown. As seen therein, a host computer 11 is connected to audio response units 12, fax system 13, operator workstation 14, data workstation 15, listing workstation 16, and public switched telephone network (PSTN) 17. A host computer 18 from a service provider such as the multi-list and/or local newspaper is connected to host computer 11. A facsimile (fax) machine 19 for faxing documents 21 is connected to PSTN 17 and is accessible to data clerks 22 at workstation 15. Operators 23 at workstation 14 are connected to PSTN 17 through telephones 24. Users of the system which may include buyers 25 and advertisers 26 access the system through PSTN 17.

In operation, users call into the system to either place ads or to access the ads on the system. For example, a seller may call a local newspaper to have an ad entered into host computer 11. Computer 11 stores the ads which may be played to the callers through audio response units 12. Faxes may be sent to the callers by fax machine 19 through PSTN 17. For real estate ads the multilist computer 18 provides the listings and updates them to host computer 11. Operators 23 interface with the callers through telephone 24 and may access the electronic classified system through the PC at workstation 14. Data entry clerks 22 also input information on ads into the system through PC 15 and may send or receive faxes from fax machine 19.

Figure 2A:
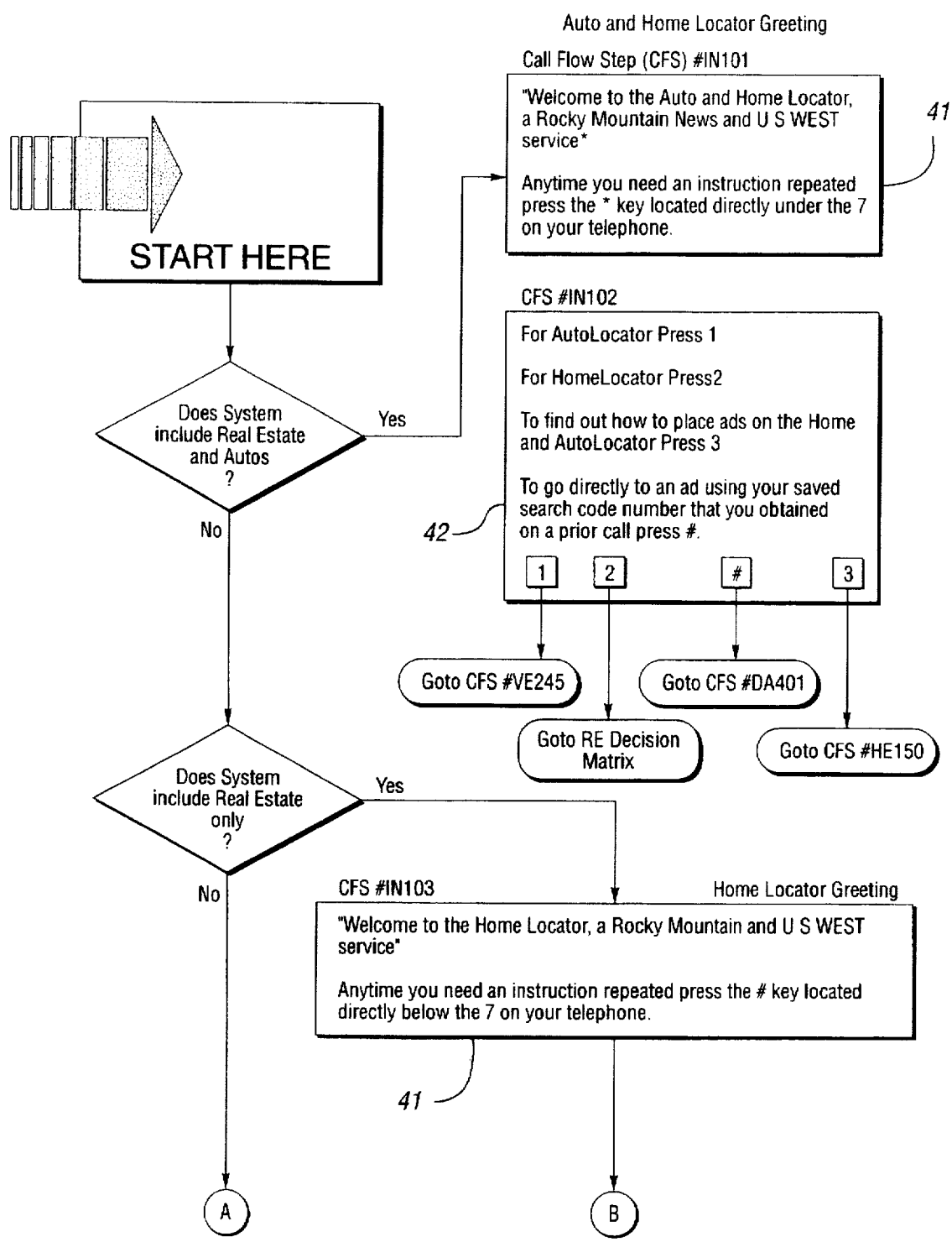
FIGS. 2a–2b are a flow chart illustrating system access interface.
Figure 2B:
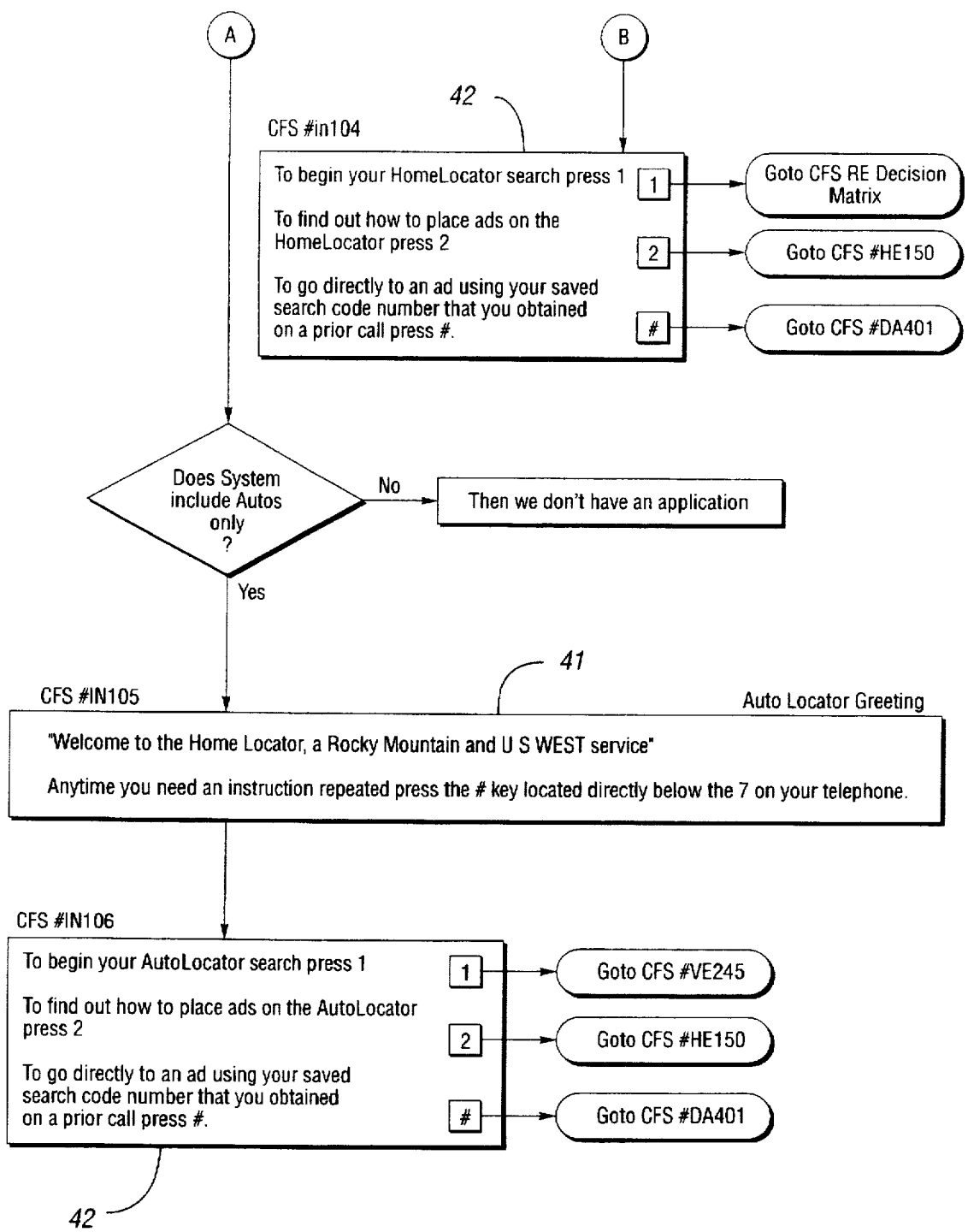
Figure 3A:
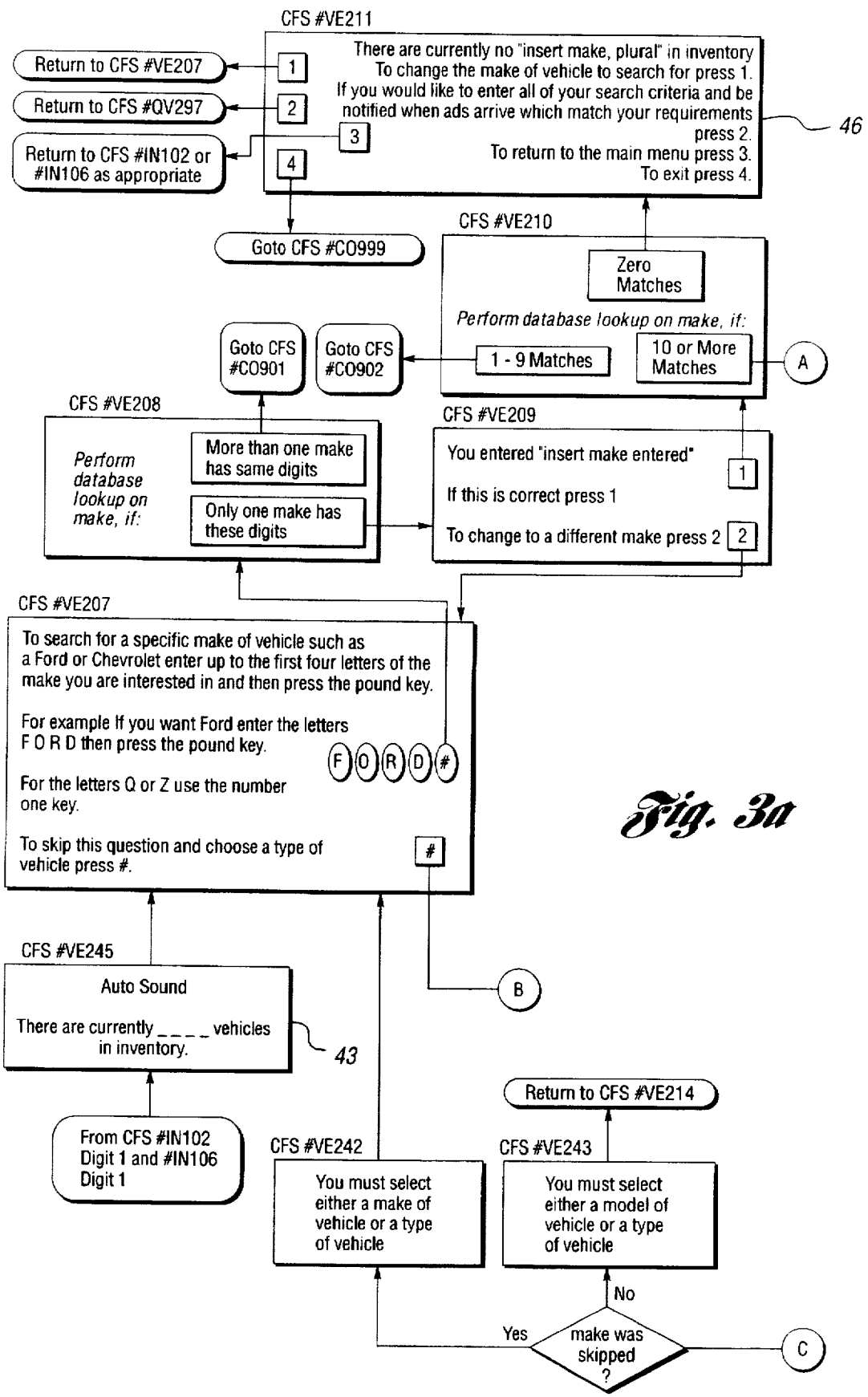
Figure 3B:
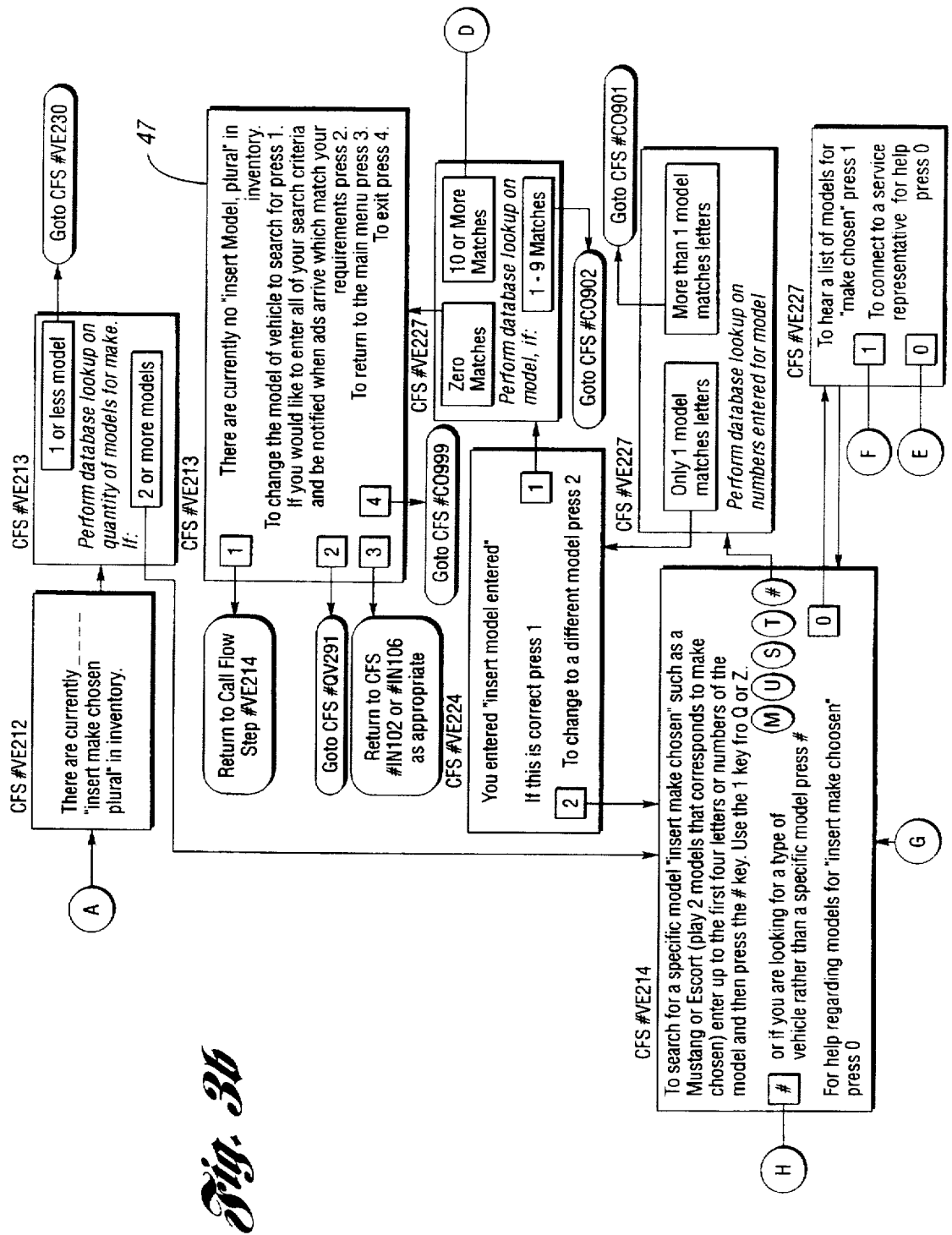
Figure 3C:
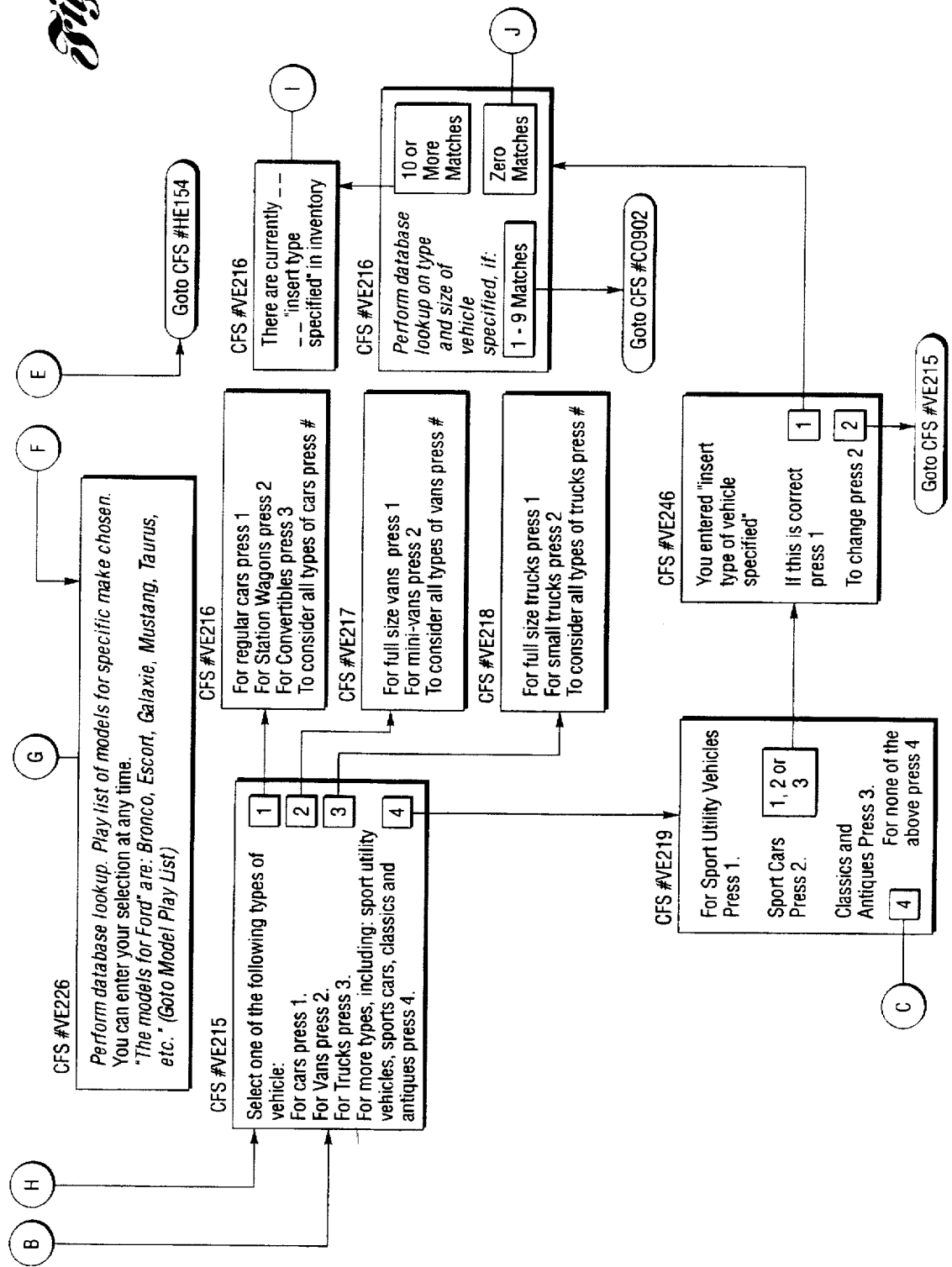
Figure 3B:
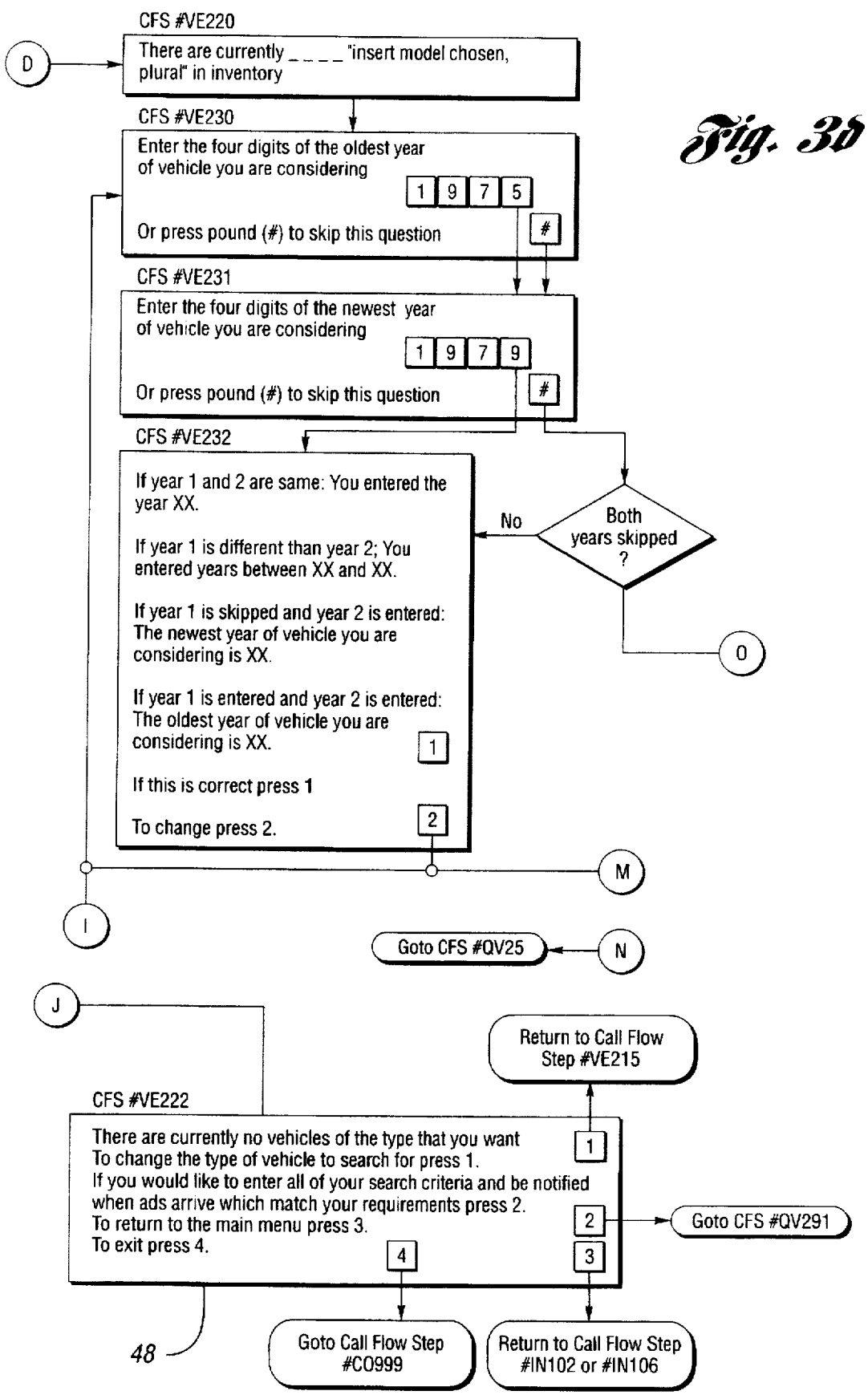
Figure 3E:
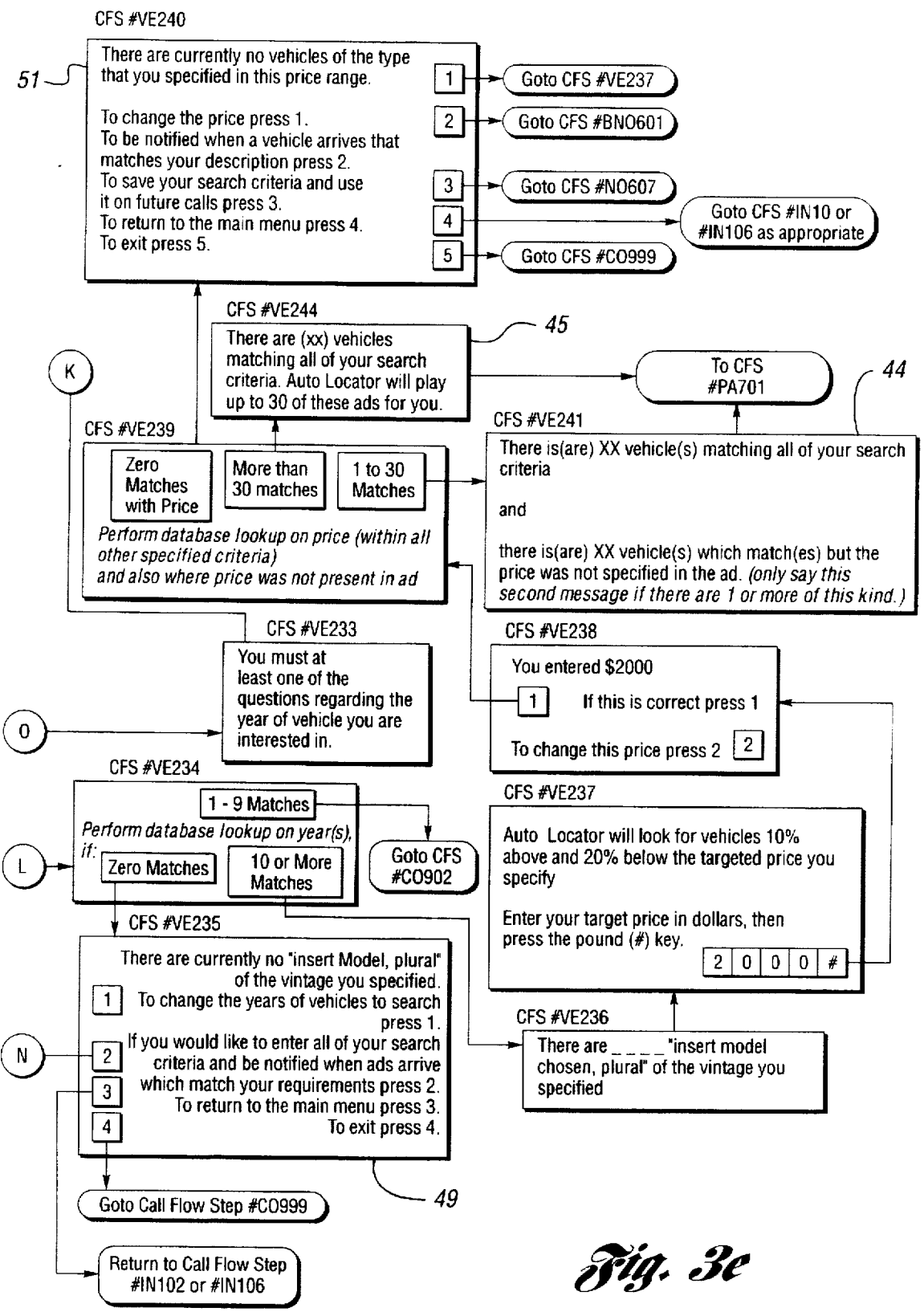

More specifically, referring now to FIGS. 2a–2b, when a user dials into the system he or she is greeted as is shown in one of boxes 41 depending upon which system is in use. That is, the system may include an auto locator, a home locator, or both, each of which contain the same interface features. The user is instructed in step 42 to press a key from the Dual Tone Multifrequency (DTMF) keypad of the user's telephone in order to access one of the functions in the system. These keys and their use are well known in the art.

If the user presses DTMF key 1 he is placed into the auto locator system of FIGS. 3a–3e. If the user has previously saved a search on the system and wishes to utilize the saved search criteria she is instructed to press the # key and is then to the direct ad access discussed in FIGS. 6a–6d below.

Referring to FIGS. 3a–3e, the auto locator system begins at step 43 with an indication of the number of vehicles currently in inventory. The user enters specific criteria for searching the database via the host computer to locate the type of vehicle he or she desires as is known in the art. If there are one or more ads which meet the search criteria then the user is so advised in steps 44 and 45. The user is then taken to the play ad flow chart (FIG. 5) discussed below.

Still referring to FIGS. 3a–3e, if, during the selection of search criteria by the user, no ads meeting the search criteria up to that point are found by the system, including make, model and price, then the user is so advised at steps 46, 47, 48, 49 and 51. The user also has the option of saving search criteria and being notified if ads are successfully retrieved in the future. When the user selects the notification option at any point in the search he is taken to the notification flow chart menu in FIG. 5 discussed below.

Figure 4A:
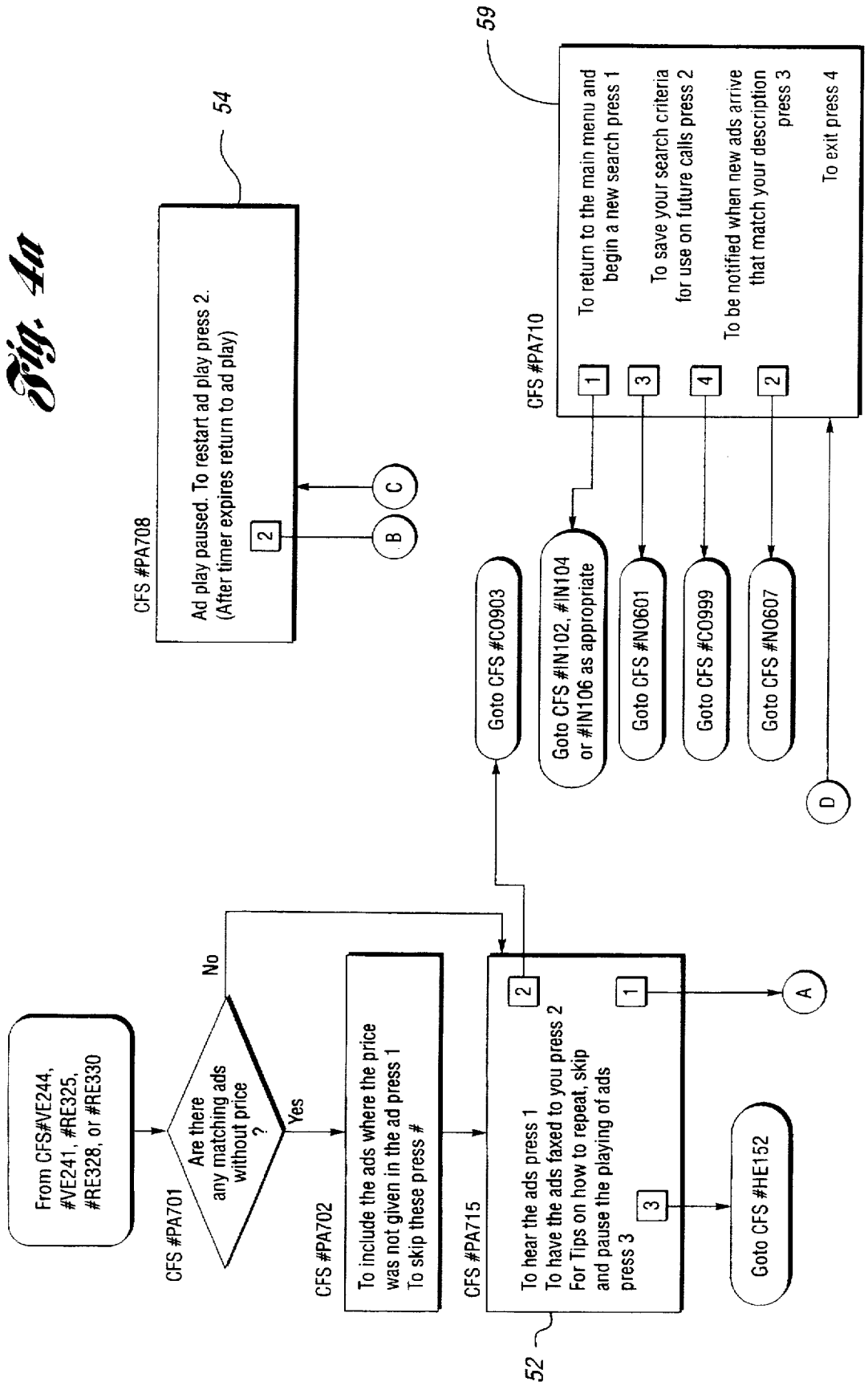
FIGS. 4a–4c are a flow chart illustrating the play advertisements interface.
Figure 4B:
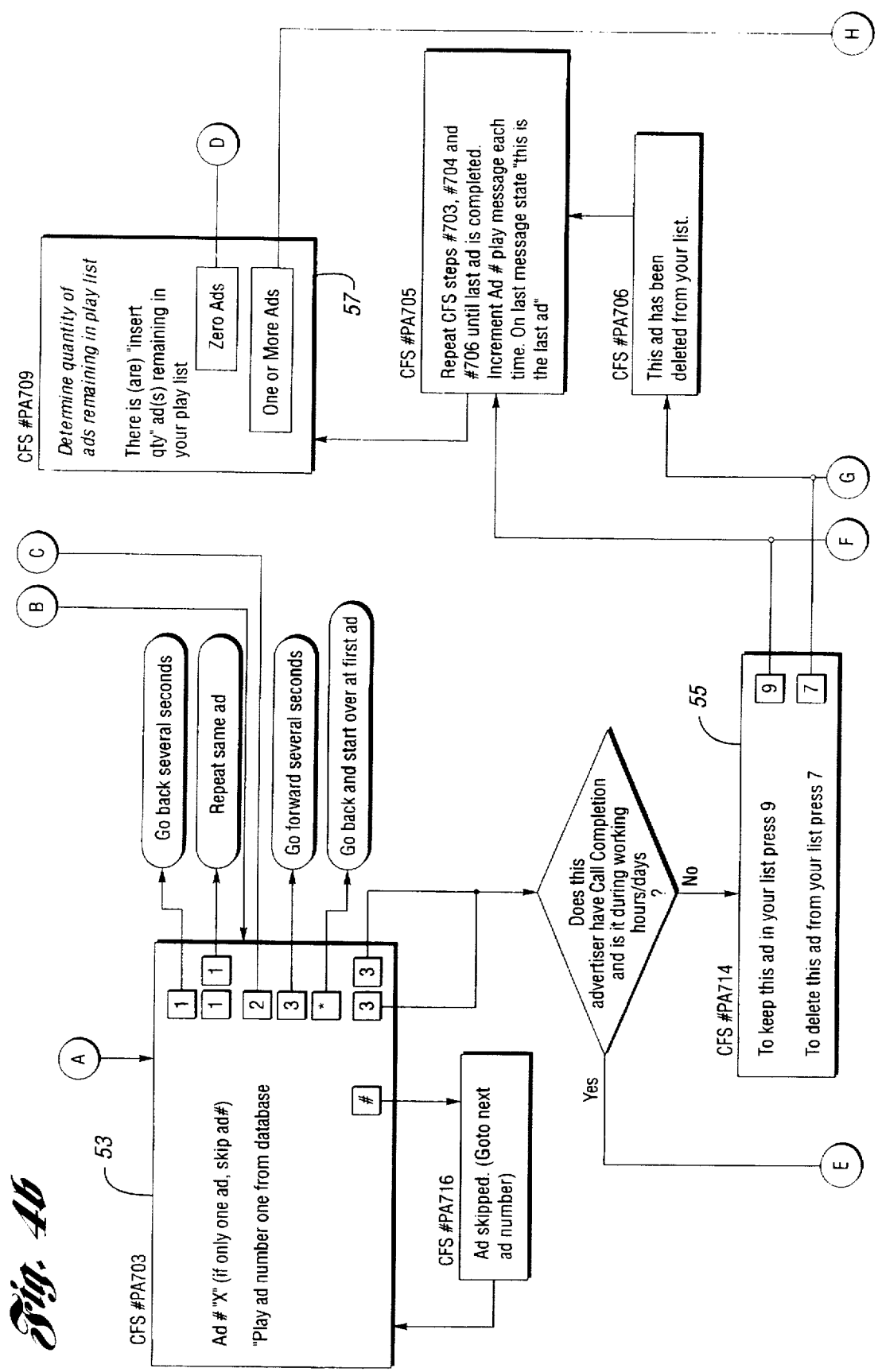
Figure 4C:
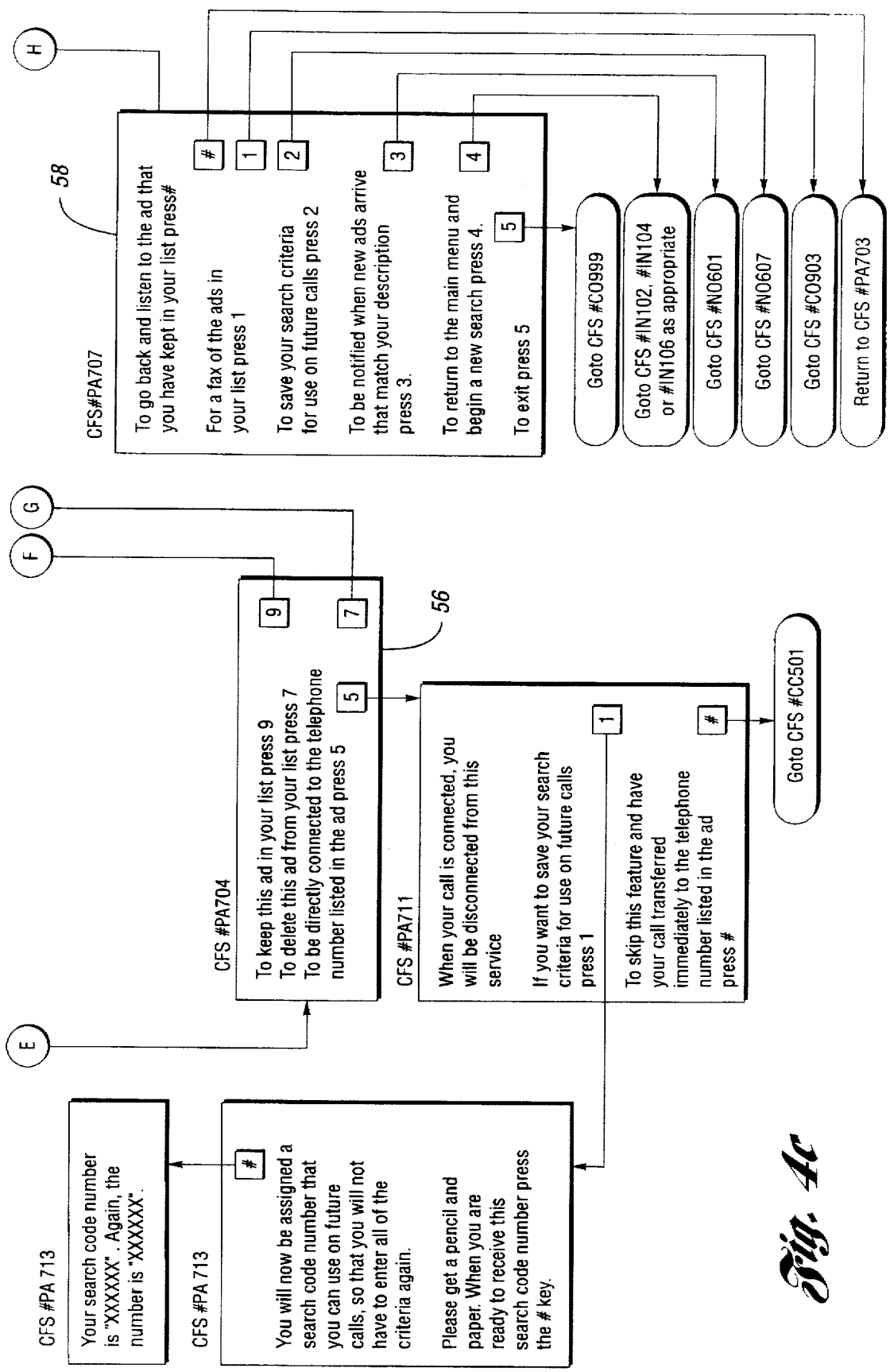

Referring to FIGS. 4a–4c, the flow chart illustrating the interface to allow the user to play advertisements which he has selected or which meet her criteria is illustrated. Step 52 therein instructs the user to press key 1 in order to hear the ads. By pressing the designated DTMF keys as listed in step 53, the user may control playback functions such as skipping forward or backward in the ad, pausing the ad, repeating one ad, or repeating all ads found.

If, in step 53 the user elects to press the 3 key twice, then she is taken to steps 55 or 56. In either step 55 or 56 the user is instructed to press key 9 to save the ad or key 7 to delete the ad from the list of ads. If the advertiser has a direct connect feature the user is instructed to press 5 in step 56 to be automatically connected to the advertiser.

After the ads in the play list have been heard the user is advised of the number of ads in the list in step 57. By following the prompts in step 58, the user may then elect to hear the ads again, begin a new search, save the existing search, receive a fax of the ads, or be notified when a new ad arrives in the system which meets the criteria of the current search.

Figure 5:
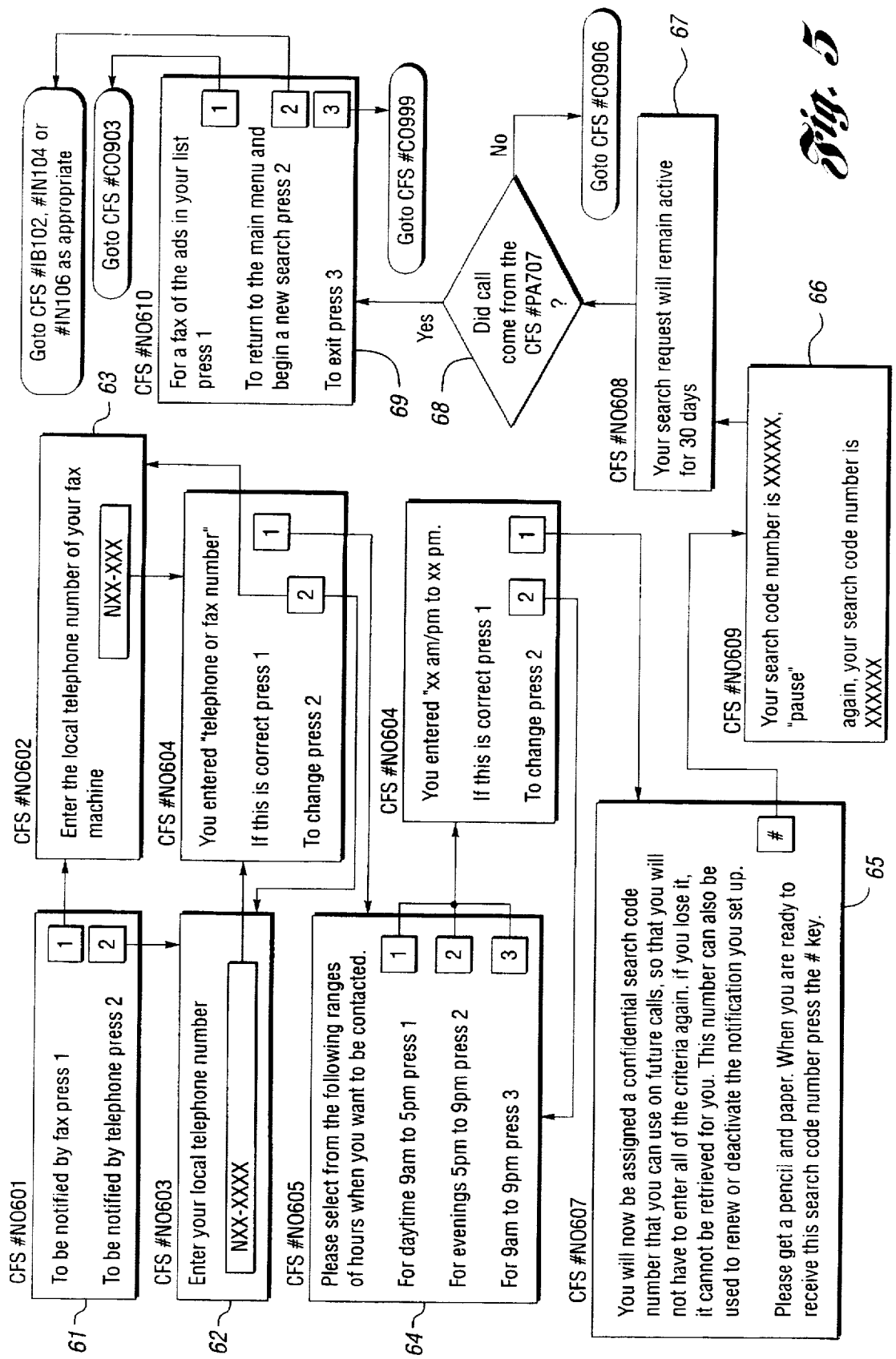
FIG. 5 is a flow chart illustrating the notification interface.
Figure 6A:
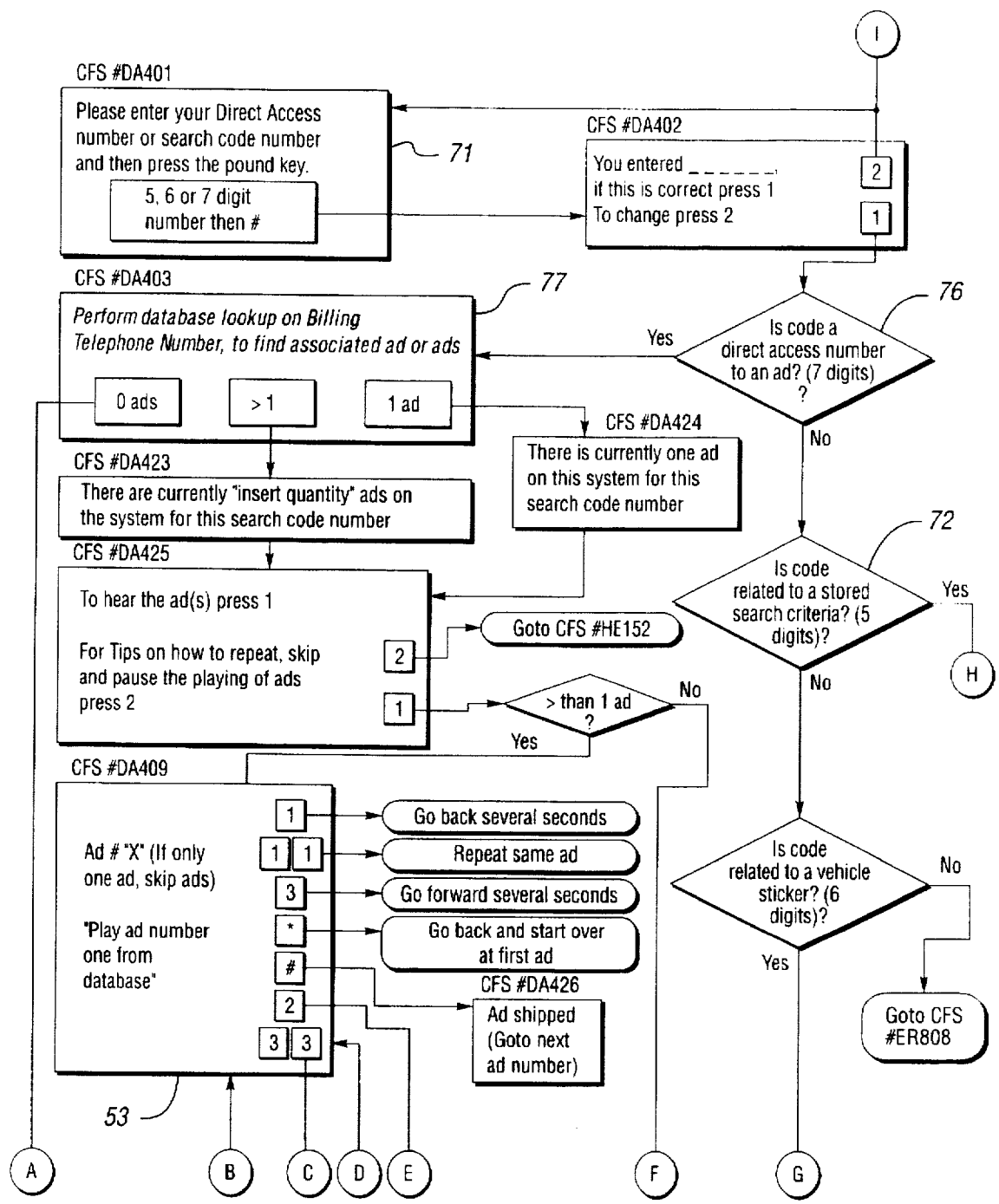
Figure 6B:
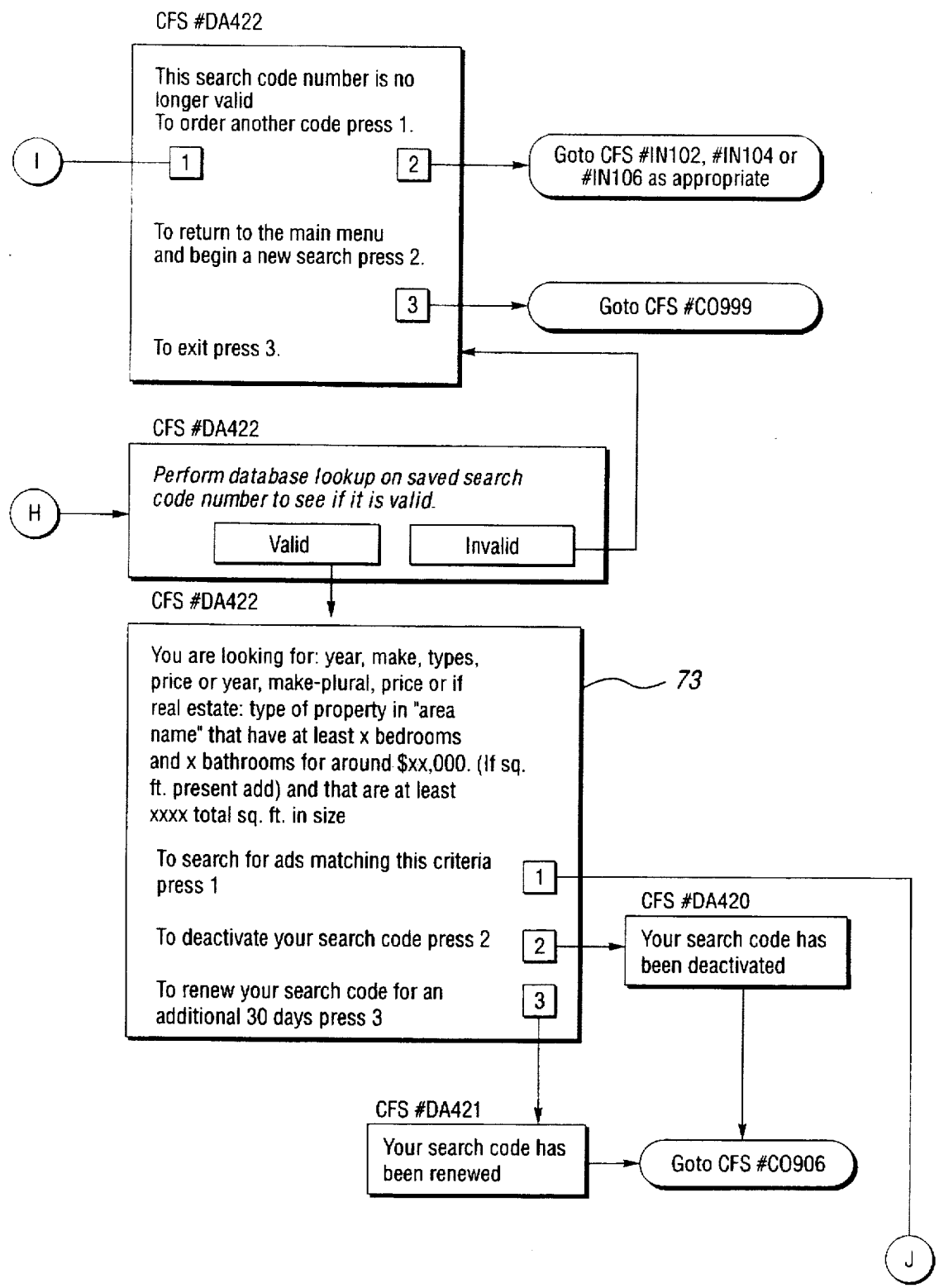
Figure 6C:
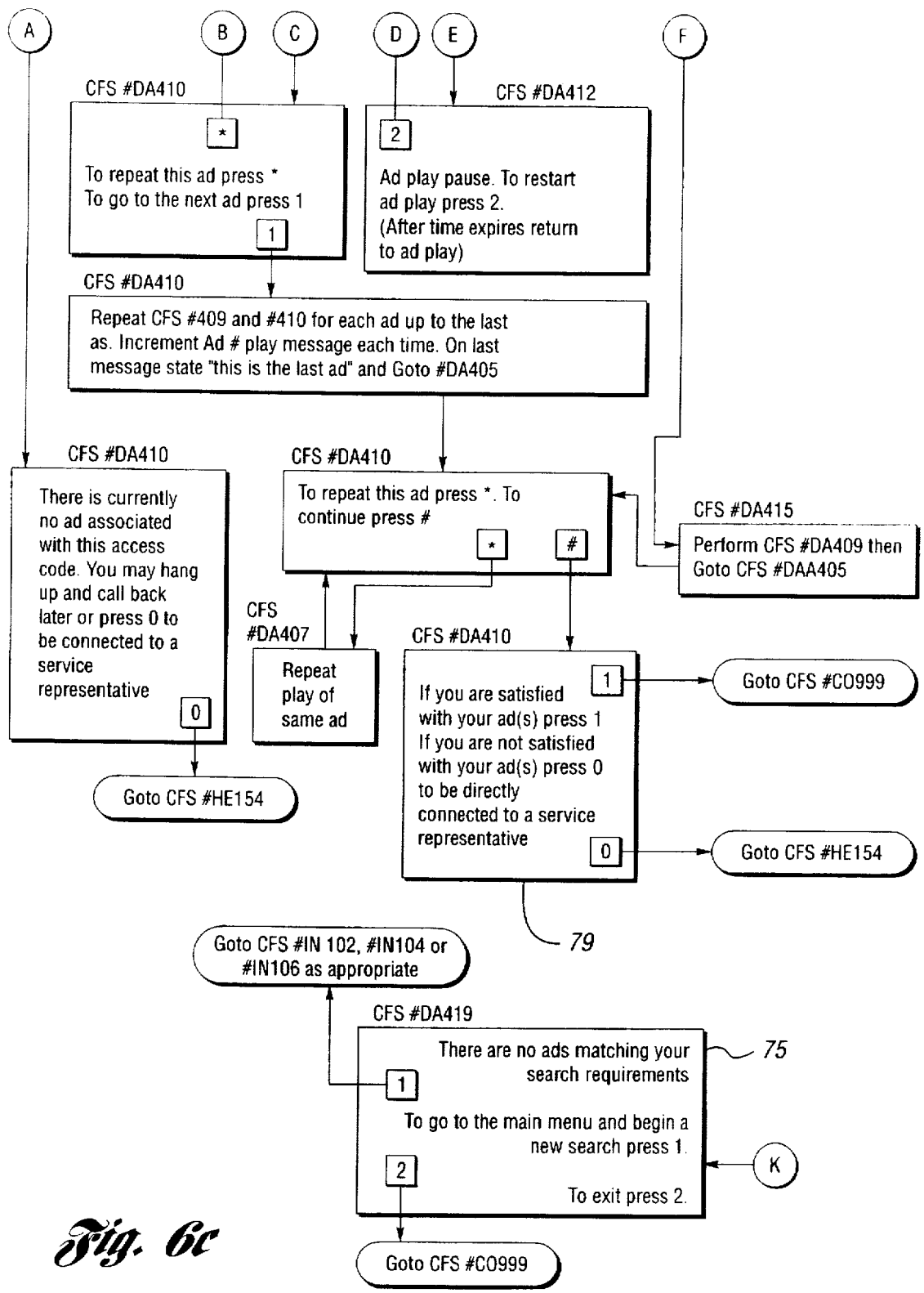
Figure 6B:
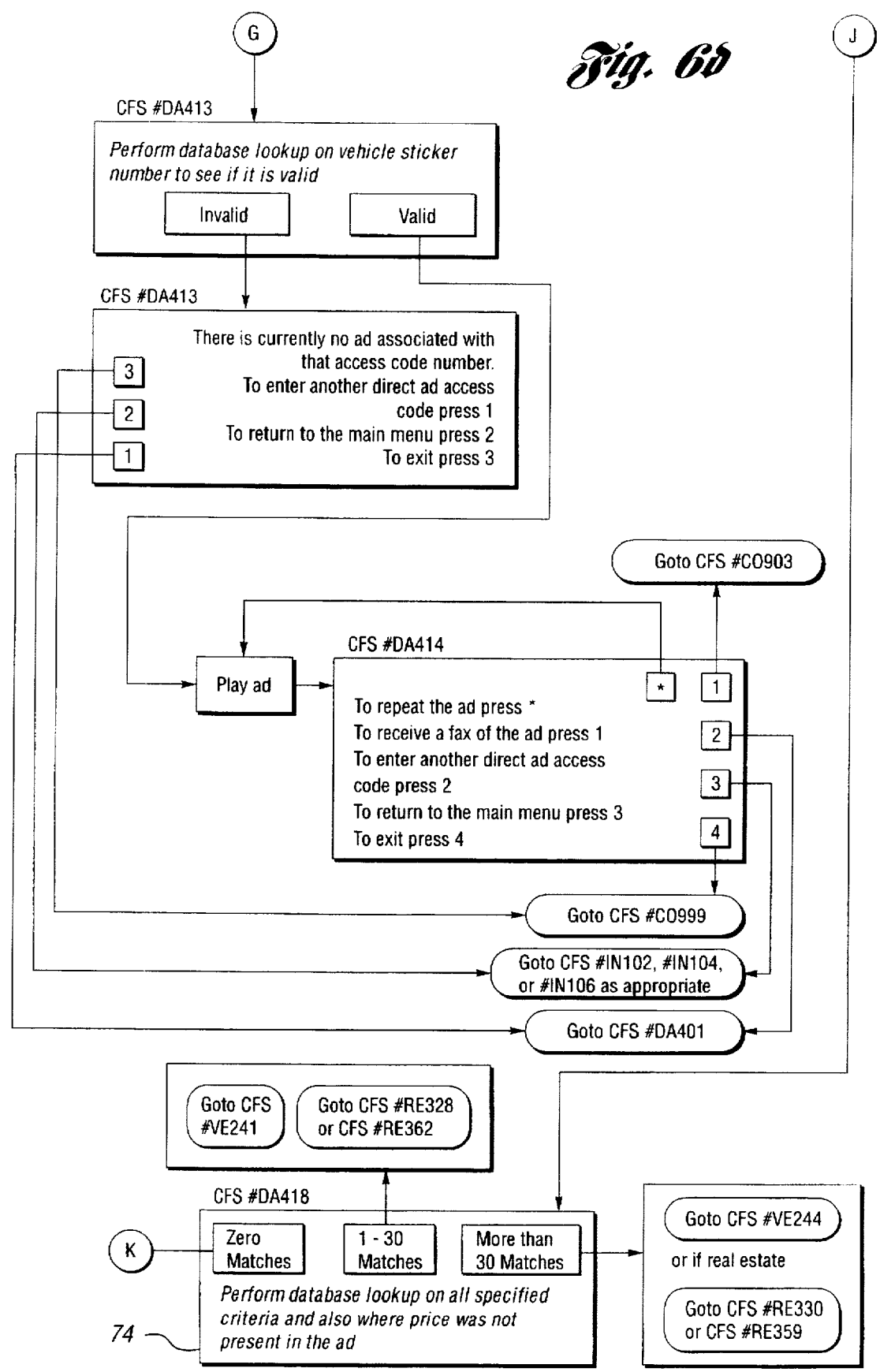

If the notification option is elected then the user is taken to the notification menu shown in FIG. 5. As seen therein, the user is instructed at step 61 to select notification by fax or telephone. The user then enters the telephone or fax numbers as instructed in steps 62 and 63, and may also select the time of day during which he wishes to receive the notification. In steps 65, 66 and 67 the user is advised of an assigned search code and that the search will be saved for a predetermined time.

In step 68 the system determines whether the user has listened to the ad(s) through the steps in FIGS. 4a–4c and if the user has been through step 58. If so, then the search is saved and the user is prompted in step 69 to press the appropriate key to receive a fax of the ads, to return to the main menu or to exit the system. If the user has come from some other step in the system such as step 51, then she is instructed to press a key to either exit the system or to return to the main menu of FIGS. 2a–2b.

Referring to FIGS. 6a–6d, if a user has selected a saved search, the system requests the search code in step 71. If, in step 72, the code is for a saved search, the system will repeat the saved search criteria in step 73 and query the user whether to execute that search, remove that search, or to renew the search code for an additional time period. If the user elects to search, the user is advised of the results and returned to steps 44 or 45 in FIGS. 3a–3e. If no matches are found, the user is so advised in step 75 and given the option to return to the main menu (FIGS. 2a–2b) or exit the system.

A unique feature of the present invention allows the advertiser to directly access all of his ads on the system. The advertiser may wish to directly access the ad(s) to check for mistakes in the ad or to hear how the ad sounds. The advertiser will be given its direct ad access number (billing number) upon entering the ad in the system by one of the operators 23, data clerks 22 or other system personnel. If the system determines in step 76 that the entered code is a direct ad access, the system searches for all of the ads which that advertiser has on the system in step 77. The advertiser will then be given the similar options in replaying the ad(s) that the user was given in step 53 of FIGS. 4a–4c.

That is, if the advertiser presses the # key, she is queried after each ad whether the ad is satisfactory at step 79. If the ad is not satisfactory the advertiser is connected to a service representative 22 or 23 by pressing 0. If the ad is satisfactory then the advertiser presses key 1 and the next ad is played or, if this is the last ad, the advertiser is taken to system exit. The foregoing description regarding the electronic classified advertising audiotex system and its operation is discussed in greater detail in U.S. Pat. application No. 08/370,065 entitled "Electronic Classified Advertising Interface Method And Instructions With Continuous Search Notification", filed Jan. 9, 1995 and assigned to the assignee of the present application, the contents of which are hereby incorporated by reference.

Referring finally to FIG. 7, a block diagram of the remote testing/reporting feature of the present invention is shown. As seen therein, a remote testing and reporting system 84 is provided in communication with PSTN 17. Preferably, test system 84 is itself an audiotex system similar to that of the audiotex system 86 it is designed to test. Test system 84 preferably comprises a conventional computer equipped with a voice circuit board and the appropriate software for performing the test and report features described in detail below.

In that regard, the remote testing and reporting system 84 places a call 88 to a first Audio Response Unit (ARU) 90 of audiotex system 86 via PSTN 17, as well as network equipment 92 associated with the system 86. As part of call 88, test system 84 generates an input signal designed to elicit an output signal from ARU 90 and/or the database associated with audiotex system 86. The input signal is preferably a test tone, but may also be an audio file, or an input/access code which itself generates an audio file. Similarly, the output signal is preferably a response tone.

Receipt of one type of output signal by test system 84 indicates that the system 86 and its associated database are operating properly, an event that is then logged by test system 84. Receipt of another type of output signal by test system 84 indicates that the audiotex system 86 is not fully operational. For example, receipt of such a signal may indicate that only ARU 90 is operational, while the associated database is down. Failure to receive any output signal is also an indication that the system 86 is not operational.

More particularly, test system 84 is preferably capable of generating a plurality of test tones available from a military tone keypad that is well known in the art. In such a fashion, more test tones are available for use than with a standard DTMF telephone keypad, and such tones cannot be inadvertently simulated by a typical user of audiotex system 86. ARU 90 is likewise preferably adapted to generate a specific tone or tones in response. The call 88 from test system 84 can be generated at selected times and intervals such that the required level of service of system 86 is adequately tested and maintained.

Thus, for example, in response to a test tone from test system 84, ARU 90 may perform a look-up in the database via a host computer 94 and generate the appropriate response tone if the electronic classified advertising system 86 is connected to the database and operating correctly. In such a fashion, test system 84 can detect and distinguish ARU 90 subsystem and host computer 94 or database failures associated with audiotex system 86. Indeed, test system 84 can quickly and efficiently test and report as to the operability of an audiotex system and its associated database, such as the electronic classified advertising system described above with respect to FIGS. 1–6d, thereby providing for advance error notification and performance tuning.

Such test procedures may be repeated by test system 84 via a call 96 to ARU 98. Indeed, via PSTN 17, test system 84 is capable of testing and reporting regarding any number of audiotex systems similar to system 86 from a single remote location.

In the event that any node on any audiotex system such as system 86 fails to provide an output signal, or fails to provide the proper output signal, indicating a problem such as an unanswered phone or a loss of the database connection, system 84 logs the failure and calls 100 the telephone number of a pager associated with maintenance personnel 102 via PSTN 17 and a pager network 104. The page preferably includes a message as to the type of problem. Such information, including the identification of the failed system and/or the location of the problem, can be determined based on the input signal and/or the output signal, the known identity of the audiotex system 86, and the known access telephone number of each ARU 90, 98 subsystem. It should be noted here that notification of the failure may be undertaken by facsimile as well as, or instead of, by pager.

Once the problem associated with the system 86 has been corrected, maintenance personnel 102 may call 106 test system 84 via PSTN 17 so that test system 84 may clear the error report. In that regard, if call 106 is not received by test system 84 within a predetermined time period, test system 84 may repeat failure notification call 100 described above. Indeed, test system 84 may repeat failure notification call 100 to different and/or additional pager and/or facsimile numbers.

As is readily apparent from the foregoing description, then, the present invention provides an improved method and system for testing an audiotex system. More specifically, the present invention provides a method and system for testing an audiotex system that eliminates the requirement that the audiotex system be equipped with specific and unique dial-in ports/lines for such testing. Moreover, the present invention further provides a method and system for testing an audiotex system capable of simultaneously verifying that the audiotex system is accepting calls and is properly connected to the database associated therewith.

It is to be understood that the present invention has been described in an illustrative manner and the terminology which has been used is intended to be in the nature of words of description rather than of limitation. As previously stated, many modifications and variations of the present invention are possible in light of the above teachings. Therefore, it is also to be understood that, within the scope of the following claims, the invention may be practiced otherwise than as specifically described.

We claim:

1. An automatic method for testing an audiotex system, the method comprising:

generating an input signal for receipt by the audiotex system;

identifying a failure if the audiotex system fails to generate an output signal in response to the input signal; and transmitting a failure notification signal, the signal having a failure type associated therewith based on the input signal and the failure to generate an output signal.

2. The method of claim 1 further comprising:

identifying a failure if the audiotex system generates an output signal in response to the input signal indicating that the audiotex system is not fully operational; and transmitting a failure notification signal, the signal having a failure type associated therewith based on the input signal and the output signal generated in response thereto.

3. The method of claim 1 wherein the input signal comprises an audio file for receipt by a subsystem of the audiotex system.

4. The method of claim 1 wherein the input signal comprises a test tone for receipt by a subsystem of the audiotex system.

5. The method of claim 1 wherein the output signal comprises a response tone.

6. The method of claim 1 further comprising:

generating a reset signal when the failure according to the failure type has been corrected; and terminating transmission of the failure notification signal in response to the reset signal.

7. The method of claim 6 further comprising transmitting a further failure notification signal if the reset signal is not generated within a predetermined period of time.

8. The method of claim 1 wherein generating an input signal is repeated at a predetermined time interval.

9. The method of claim 1 wherein transmitting the failure notification signal is undertaken via a pager.

10. The method of claim 1 wherein transmitting the failure notification signal is undertaken via a facsimile.

11. An automatic system for testing an audiotex system, the system comprising:

means for generating an input signal for receipt by the audiotex system;

means for identifying a failure if the audiotex system fails to generate an output signal in response to the input signal; and means for transmitting a failure notification signal, the signal having a failure type associated therewith based on the input signal and the failure to generate an output signal.

12. The system of claim 11 further comprising:

means for identifying a failure if the audiotex system generates an output signal in response to the input signal indicating that the audiotex system is not fully operational; and means for transmitting a failure notification signal, the signal having a failure type associated therewith based on the input signal and the output signal generated in response thereto.

13. The system of claim 11 wherein the input signal comprises an audio file for receipt by a subsystem of the audiotex system.

14. The system of claim 11 wherein the input signal comprises a test tone for receipt by a subsystem of the audiotex system.

15. The system of claim 11 wherein the output signal comprises a response tone.

16. The system of claim 11 further comprising:

means for generating a reset signal when the failure according to the failure type has been corrected; and means for terminating transmission of the failure notification signal in response to the reset signal.

17. The system of claim 16 further comprising means for transmitting a further failure notification signal if the reset signal is not generated within a predetermined period of time.

18. The system of claim 11 wherein the means for generating an input signal does so repeatedly at a predetermined time interval.

19. The system of claim 11 wherein the means for transmitting the failure notification signal includes a pager.

20. The system of claim 11 wherein means for transmitting the failure notification signal includes a facsimile.

* * * * *